US012613307B2

(12) United States Patent
Kim et al.

(10) Patent No.: US 12,613,307 B2
(45) Date of Patent: Apr. 28, 2026

(54) RADAR APPARATUS AND METHOD OF SUPPRESSING IN-BAND INTERFERENCE THEREIN

(71) Applicant: ELECTRONICS AND TELECOMMUNICATIONS RESEARCH INSTITUTE, Daejeon (KR)

(72) Inventors: Hyung Jung Kim, Daejeon (KR); Min Soo Kang, Daejeon (KR); Sang In Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 18/078,690

(22) Filed: Dec. 9, 2022

(65) Prior Publication Data

US 2024/0125893 A1      Apr. 18, 2024

(30) Foreign Application Priority Data

Oct. 14, 2022    (KR) ........................ 10-2022-0132406

(51) Int. Cl.
| | |
|---|---|
| G01S 7/292 | (2006.01) |
| G01S 7/02 | (2006.01) |
| G01S 7/285 | (2006.01) |

(52) U.S. Cl.
CPC ............. G01S 7/023 (2013.01); G01S 7/285 (2013.01); G01S 7/292 (2013.01); G01S 7/02 (2013.01)

(58) Field of Classification Search
CPC ........ G01S 7/0232; G01S 7/023; G01S 7/292; G01S 7/285
See application file for complete search history.

(56) References Cited

U.S. PATENT DOCUMENTS

| | | | |
|---|---|---|---|
| 6,867,731 B2 * | 3/2005 | Dizaji | G01S 7/292 |
| | | | 342/159 |
| 8,149,961 B1 * | 4/2012 | Tewfik | H04L 27/2665 |
| | | | 370/320 |

(Continued)

FOREIGN PATENT DOCUMENTS

| | | |
|---|---|---|
| EP | 1580573 A1 | 9/2005 |
| KR | 1020040007249 A | 1/2004 |

(Continued)

OTHER PUBLICATIONS

Hai Deng, "Effective CLEAN Algorithms for Performance-Enhanced Detection of Binary Coding Radar Signals", IEEE Transactions on Signal Processing, vol. 52, No. 1, Jan. 2004. pp. 72-78.

(Continued)

*Primary Examiner* — Jack W Keith
*Assistant Examiner* — John Bishoy Sam Abraham
(74) *Attorney, Agent, or Firm* — Rabin & Berdo, P.C.

(57) ABSTRACT

The present disclosure provides a radar apparatus capable of suppressing a radar-to-radar in-band interference caused by a signal derived from another radar apparatus in a radar system in which a plurality of radar apparatuses share frequency resource to increase a frequency utilization efficiency. The radar apparatus includes: a receiver configured to acquire a received signal; a plurality of matched filters arranged in parallel to filter the receive signal, each corresponding to respective one of the plurality of radar apparatus to use a transmit signal of a corresponding radar apparatus as a reference signal; and a signal reconstructor configured to select a matched filter most adequate for an interference suppression based on outputs of the plurality of matched filters, subtract the reference signal of a selected matched filter at least partially from the receive signal, and reconstruct a desired echo signal to be used to determine a target.

8 Claims, 7 Drawing Sheets

(56)  References Cited

U.S. PATENT DOCUMENTS

| | | | |
|---|---|---|---|
| 9,194,947 B1 * | 11/2015 | Mohamed | G01S 13/28 |
| 9,363,024 B2 | 6/2016 | Nguyen et al. | |
| 2006/0268923 A1 | 11/2006 | Wu et al. | |
| 2012/0007773 A1 * | 1/2012 | Smith | G01S 13/524 |
| | | | 342/195 |
| 2015/0378007 A1 * | 12/2015 | Lucas | G01S 13/582 |
| | | | 342/175 |
| 2018/0113191 A1 * | 4/2018 | Villeval | G01S 7/0235 |
| 2021/0149017 A1 * | 5/2021 | Fam | G01S 7/295 |
| 2024/0111020 A1 * | 4/2024 | Rosu | G01S 7/354 |

FOREIGN PATENT DOCUMENTS

| | | | |
|---|---|---|---|
| KR | 100936173 B1 | 1/2010 | |
| KR | 1020140010311 A | 1/2014 | |
| KR | 20180134012 A | 12/2018 | |
| KR | 102326398 B1 | 11/2021 | |

OTHER PUBLICATIONS

Sun-min Lim et al., "Frequency Reuse Method for Multi-Site Weather Radar", (J-KICS) '14-02 vol. 39A, No. 02, Feb. 28, 2014, pp. 109-116.

\* cited by examiner

Figure 3:
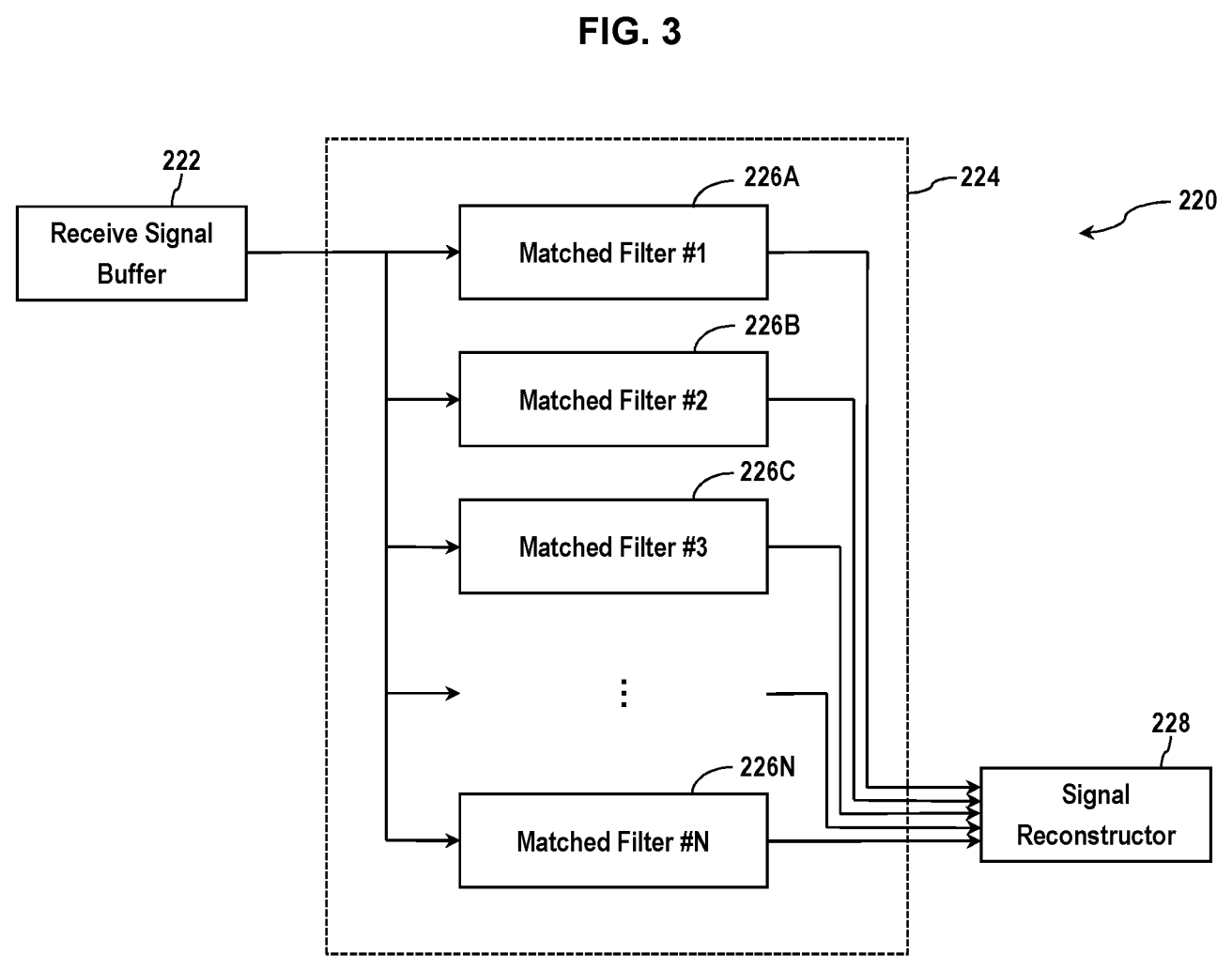

222
Receive Signal Buffer

224

226A
Matched Filter #1

226B
Matched Filter #2

226C
Matched Filter #3

. . .

226N
Matched Filter #N

228
Signal Reconstructor

RADAR APPARATUS AND METHOD OF SUPPRESSING IN-BAND INTERFERENCE THEREIN

CROSS-REFERENCE TO RELATED APPLICATION

The present application claims a convention priority under 35 U.S.C. 119 based on Korean Patent Application No. 10-2022-0132406 filed on Oct. 14, 2022 with the Korean Intellectual Property Office (KIPO), the entire content of which is incorporated herein by reference.

BACKGROUND

1. Field of the Disclosure

The disclosure relates to a radar apparatus and a signal processing method in the radar apparatus. In particular, the disclosure relates to a radar apparatus capable of suppressing interference caused by signals of other radars in a radar system in which a plurality of radar apparatuses shares frequency resource, and a method for suppressing such interference.

2. Description of Related Art

A radar system has used a frequency resource for each radar which does not overlaps with the frequency resource of another radar to reject an interference between the radars. However, an increase in the number of radars and a shortage of frequency resources brought about a need to frequency sharing between the radars to increase a frequency utilization efficiency, and a system in which a plurality of radars share the frequencies by using orthogonal signals has been developed.

In an orthogonal signal-based frequency sharing radar system, each radar is assigned with a separate orthogonal signal, so that the radar transmits a signal by use of its unique orthogonal signal. At a receiving stage, the radar excludes signal components originated from other radars, from a received signal, by a matched filter to extract its own signal, and detects a distance to the target and a direction and speed of a target. Typically, the signal receiving stage of the radar employs an interference suppression algorithm in addition to the matched filter to suppress the interference caused by the signals derived from the other radars.

In the orthogonal signal-based frequency sharing radar system, the orthogonality of the orthogonal signals is affected by a performance of the interference suppression algorithm. One of the most common interference suppression algorithms used in the radar system may be the CLEAN algorithm. In the CLEAN algorithm, the interference is cancelled or mitigated through an iterative reconstruction process. However, the interference suppression performance of the CLEAN algorithm deteriorates as the number of radars sharing the frequency increases.

Thus, a frequency sharing radar system including a large number of radars sharing the frequency requires another interference suppression method that shows a superior performance to a conventional method technology is required in order for each radar to suppress the radar-to-radar interference and ensure the detection performance. That is, there is a need for an interference suppression method that exhibits an excellent interference suppression performance and can maintain the interference suppression performance even when the number of concurrently used radars increases.

SUMMARY

Exemplary embodiments of the disclosure provide a radar apparatus capable of guaranteeing a detection performance of the radar apparatus while suppressing a radar-to-radar in-band interference caused by a signal derived from another radar apparatus in a radar system in which a plurality of radar apparatuses share frequency resource to increase a frequency utilization efficiency.

Exemplary embodiments of the disclosure provide an interference suppression method capable of ensuring a detection performance of a radar apparatus while suppressing a radar-to-radar in-band interference in the radar apparatus caused by a signal derived from another radar apparatus in a radar system in which a plurality of radar apparatuses share frequency resource to increase a frequency utilization efficiency.

According to an aspect of an exemplary embodiment, a radar apparatus is one of a plurality of radar apparatuses sharing frequency resource. The radar apparatus includes: a receiver configured to acquire a receive signal; a plurality of matched filters arranged in parallel to filter the receive signal, each corresponding to respective one of the plurality of radar apparatus to use a transmit signal of a corresponding radar apparatus as a reference signal; and a signal reconstructor configured to select a matched filter most adequate for an interference suppression based on outputs of the plurality of matched filters, subtract the reference signal of a selected matched filter at least partially from the receive signal, and reconstruct a desired echo signal to be used to determine a target.

The signal reconstructor may select one matched filter having an output with a largest peak among the plurality of matched filters as the matched filter most adequate for the interference suppression.

The signal reconstructor may select the matched filter most adequate for the interference suppression, subtract the reference signal of the selected matched filter from the receive signal, and reconstruct the desired echo signal repeatedly until a predetermined termination condition is satisfied.

The termination condition may include at least one of: a condition that the receive signal contains only noise component without any remaining echo signal component, a condition that a magnitude of the receive signal is lowered below a predetermined threshold, a condition that a standard deviation of the receive signal is lowered below a predetermined threshold, and a condition that a magnitude of the reconstructed desired echo signal is increased beyond a predetermined threshold.

The signal reconstructor may identify that the receive signal contains only the noise component by an autocorrelation coefficient or an autocovariance coefficient for the receive signal.

Each time the signal reconstructor repeats an operation of selecting the matched filter most adequate for the interference suppression, subtracting the reference signal of the selected matched filter from the receive signal, and reconstructs the desired echo signal, the signal reconstructor may calculate a residual signal by subtracting the reference signal of the selected matched filter from the receive signal according to a following equation:

$$\mathrm{Temp} = Rx - a \times b_k(x)$$

where '$b_k(x)$' is the reference signal of the selected matched filter, 'Rx' is the receive signal, 'Temp' is the residual signal, and '$a$' denotes a weighting factor representing a degree to which the reference signal '$b_k(x)$' is subtracted from the receive signal 'Rx'.

The signal reconstructor may reconstruct the desired echo signal by a following equation:

$$T_{seq} \leftarrow T_{seq} + a \times b_m(x)$$

where '$T_{seq}$' is the reconstructed desired echo signal, and '$b_m(x)$' is the reference signal of the matched filter corresponding to a present radar apparatus.

The radar apparatus may further include a receive signal buffer configured to store the receive signal and the residual signal.

The radar apparatus may further include a radar receive signal processor configured to determine target information based on the reconstructed desired echo signal.

The radar receive signal processor may determine a position and a speed of the target based on the reconstructed desired echo signal with reference to a target position estimation which may be included in the target information.

According to another aspect of an exemplary embodiment, a method of suppressing interference in any one radar apparatus among a plurality of radar apparatuses sharing frequency resource, includes: acquiring a receive signal; filtering the receive signal by a plurality of matched filters disposed in parallel, each corresponding to respective one of the plurality of radar apparatus to use a transmit signal of a corresponding radar apparatus as a reference signal; selecting a matched filter most adequate for an interference suppression based on outputs of the plurality of matched filters; and subtracting the reference signal of the selected matched filter at least partially from the receive signal and reconstructing a desired echo signal to be used to determine a target.

The operation of selecting the matched filter most adequate for the interference suppression may include selecting one matched filter having an output with a largest peak among the plurality of matched filters as the matched filter most adequate for interference suppression.

The operation of subtracting the reference signal of the selected matched filter at least partially from the receive signal may include replacing the receive signal with a residual signal obtained by subtracting the reference signal of the selected matched filter at least partially from the receive signal.

The operation of replacing the receive signal with the residual signal may be performed only when a signal power decreases after a replacing operation.

The operation of replacing the receive signal with the residual signal may include: calculating a standard deviation of the receive signal before subtracting the reference signal of the selected matched filter at least partially from the receive signal and a standard deviation of the residual signal after a subtracting operation; and determining that the signal power decreases after the replacing operation the when the standard deviation of the receive signal before subtracting the reference signal of the selected matched filter at least partially from the receive signal is smaller than the standard deviation of the residual signal after the subtracting operation.

The operation of subtracting the reference signal of the selected matched filter at least partially from the receive signal may include: determining the residual signal by a following equation:

$$Temp = Rx - a \times b_k(x)$$

where '$b_k(x)$' is the reference signal of the selected matched filter, 'Rx' is the receive signal, 'Temp' is the residual signal, and '$a$' denotes a weighting factor representing a degree to which the reference signal '$b_k(x)$' is subtracted from the receive signal 'Rx'.

The operation of reconstructing the desired echo signal may include: determining the reconstructed desired echo signal by a following equation:

$$T_{seq} \leftarrow T_{seq} + a \times b_m(x)$$

where '$T_{seq}$' is the reconstructed desired echo signal, and '$b_m(x)$' is the reference signal of the filter corresponding to a present radar apparatus.

The operations of filtering the receive signal, selecting the matched filter most adequate for the interference suppression, and subtracting the reference signal of the selected matched filter at least partially from the receive signal to reconstruct the desired echo signal may be repeatedly performed until a predetermined termination condition is satisfied.

The termination condition may include at least one of: a condition that the receive signal contains only noise component without any remaining echo signal component, a condition that a magnitude of the receive signal is lowered below a predetermined threshold, a condition that a standard deviation of the receive signal is lowered below a predetermined threshold, and a condition that a magnitude of the reconstructed desired echo signal is increased beyond a predetermined threshold.

Whether the receive signal contains only noise component or not may be identified by an autocorrelation coefficient or an autocovariance coefficient for the receive signal.

According to an exemplary embodiment of the disclosure, a radar system that shares frequency resources between radar apparatuses can exhibit interference suppression performance superior to that of the conventional system, while suppressing the interference caused by frequency sharing between radar apparatuses using the same band or adjacent band frequencies. Accordingly, the disclosure can increase frequency utilization efficiency in a radar system.

In particular, the interference suppression method according to the disclosure can suppress not only the interference caused by other radar apparatuses, but also the sidelobe peak of the autocorrelation signal. As a result, an additional improvement in detection performance can be expected.

There is an advantage in that it is possible to implement the interference suppression method of the disclosure with a configuration in which an additional module is added to not only newly manufactured radar apparatuses but also existing manufactured and operated radar apparatuses.

There disclosure can be applied to all radar apparatuses as far as the frequency sharing is available regardless of the type of the radar system and the application field of the system, e.g. air traffic control, weather, coast/harbor surveillance, and drone detection. As the demand for radar increases, the problem of lack of available frequency resources is emerging and frequency sharing is inevitable. However, the disclosure makes it possible to greatly suppress the interference caused by frequency sharing in an environment where frequency sharing takes place, and makes frequency sharing practically possible.

BRIEF DESCRIPTION OF THE DRAWINGS

In order that the disclosure may be well understood, there will now be described various forms thereof, given by way of example, reference being made to the accompanying drawings, in which:

FIG. 3 is a detailed block diagram of an interference suppression processor shown in FIG. 2;

Figure 1:
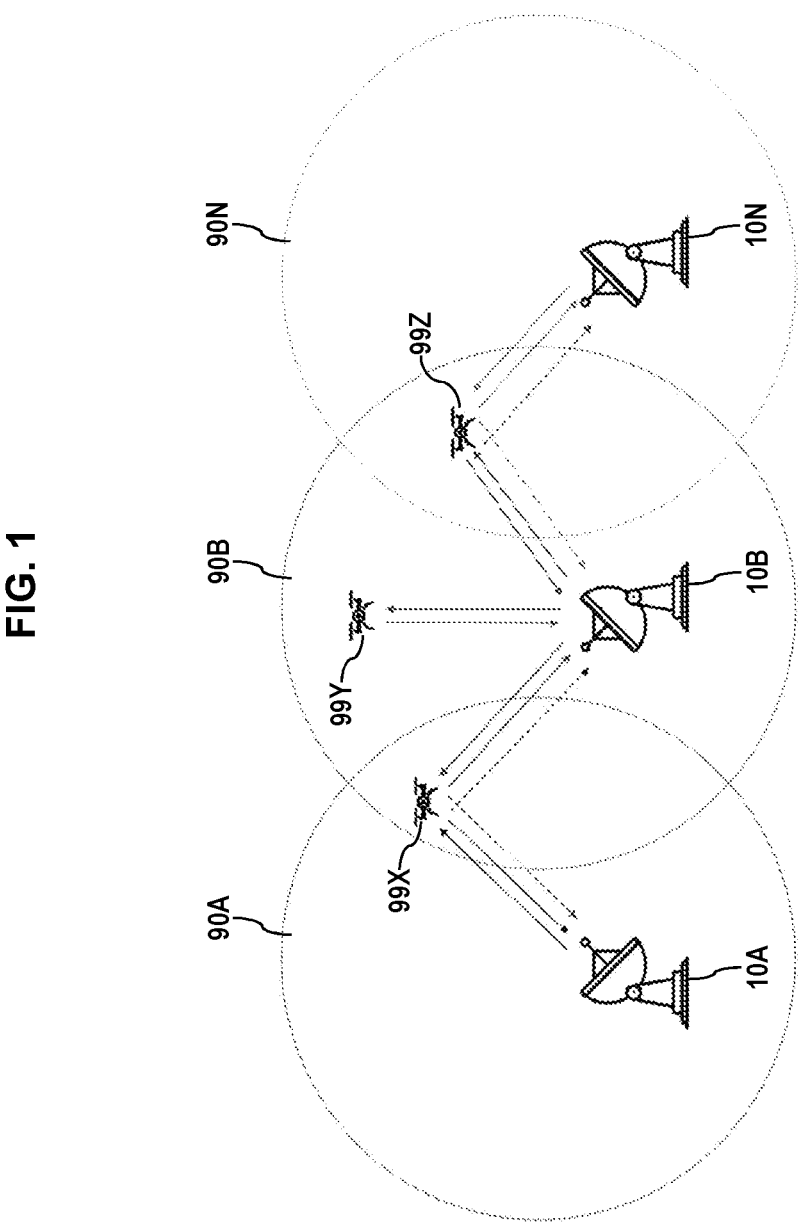
FIG. 1 is an illustration of a frequency sharing radar system according to an exemplary embodiment of the disclosure.

The drawings described herein are for illustration purposes only and are not intended to limit the scope of the present disclosure in any way.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 illustrates an example of a frequency sharing radar system according to an exemplary embodiment of the disclosure. The frequency sharing radar system may include a first through N-th radar apparatuses 10A-10N. Each of the first through N-th radar apparatuses 10A-10N radiates a transmit signal through respective transmit antennas, receives an echo signal reflected from a target, determines a delay time between the transmit signal and the echo signal, and determines a distance to the target based on the delay time.

A geographical operating area (i.e., coverage) of each radar apparatuses 10A-10N may be partitioned in a cellular pattern. However, the disclosure is not limited to this, and the coverage of each radar apparatuses 10A-10N may overlap greatly, so that some radar apparatuses may be set to operate in a small area while at least some of the other radar apparatuses may be set to operate in a wide area. In the drawing, the first radar apparatus 10A may perform positioning and tracking operations on a target 99X in its operating area 90A. The second radar apparatus 10b may perform positioning and tracking operations on targets 99X, 99Y, and 99Z in its operating area 90B. Similarly, the N-th radar apparatus 10N may also perform positioning and tracking operations on a target 99Z in its operating area 90N.

The first to N-th radar apparatuses 10A-10N may operate based on the same frequency resource. That is, the transmit signals output by the first to N-th radar apparatuses 10A-10N may have the same or adjacent frequency resource. For example, in each radar apparatus, the transmit signal and the received echo signal may have a frequency in, for example, 8.5 to 10.5 GHz band or a frequency band before and after the band. In this specification including the appended claims, the term "in-band" may include not only the case where the frequencies are the same, but also the case where the frequencies are different but in the same band and the case where the frequencies are in an adjacent band. Therefore, in this specification, the term "same frequency" is used as a meaning including the case where there is a slight difference in frequencies.

Since the radar apparatuses operate with the same frequency, a target signal received by each radar apparatus may include a signal that the transmit signal originated by itself is reflected from the target and a signal that the transmit signal originated from another radar apparatus is reflected from the target. For example, in FIG. 1, the reflected target signal received by the second radar apparatus 10B may include a signal that the transmit signal from the first radar apparatus 10A is reflected from the target 99X and a signal that the transmit signal from the N-th radar apparatus 10N is reflected from the target 99Z in addition to the signals that the transmit signal from the second radar apparatus 10B is reflected from the target 99X, 99Y, or 99Z.

In consideration of this, different orthogonal signals are allocated to each radar apparatus 10A-10N, and a corresponding radar transmits a signal using its own orthogonal signal. Each of the radar apparatuses 10A-10N may detect a distance to the target and a direction of the target by suppressing other radar signals from the received echo signal and extracting only its own signal by the interference suppression method according to the disclosure.

Figure 2:
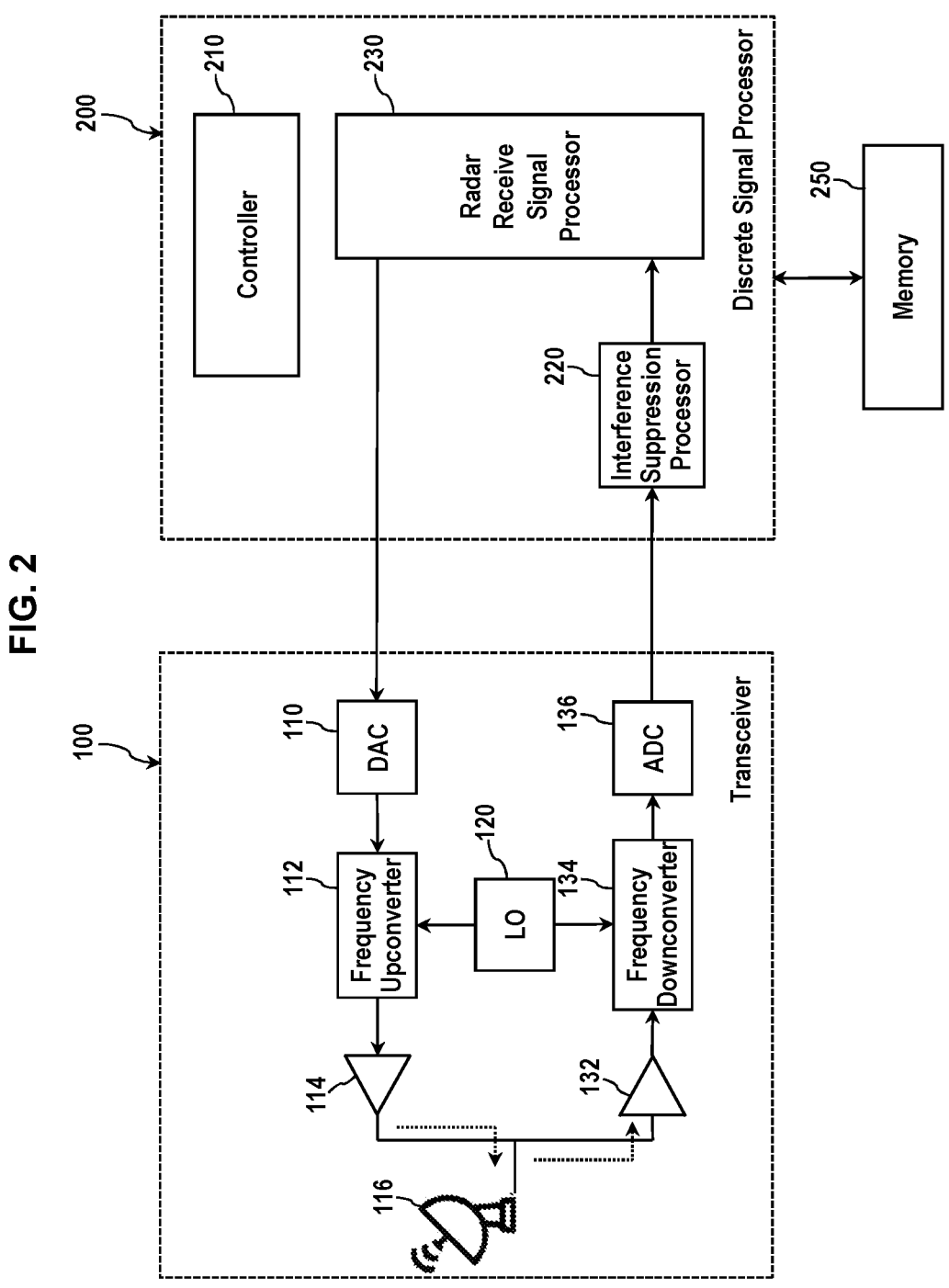
FIG. 2 is a block diagram of a radar apparatus according to an exemplary embodiment of the disclosure.

FIG. 2 is a block diagram of the radar apparatus according to an exemplary embodiment of the disclosure. The radar apparatus may include a transceiver 100 and a discrete signal processor 200. The transceiver 100 converts the bit stream provided by the discrete signal processor 200 into a radio signal to radiate toward a detection space and converts a receive signal into a digital bit stream to provide to the discrete signal processor 200. The discrete signal processor 200 may control the transceiver 100, provide the transceiver 100 with data required to generate the transmit signal, and detect the position of the target and track the target while suppressing the interference caused by other radar apparatuses based on the bit stream received from the transceiver 100.

The transceiver 100 may include a digital-to-analog converter 110, a frequency upconverter 112, a power amplifier 114, a transceiver antenna 116, a local oscillator 120, a low noise amplifier 132, a frequency downconverter 134, and an analog-to-digital converter 136.

The digital-to-analog converter 110 may convert a binary code transmit signal into an analog intermediate frequency (IF) transmit signal. The frequency upconverter 112 modulates the IF transmit signal using a high frequency (RF) carrier signal from the local oscillator 120 to generate a RF signal. The power amplifier 114 amplifies the RF signal enough to drive the transceiver antenna 116 so that a RF transmit signal of high-output is radiated through the transceiver antenna 116.

The transceiver antenna 116 may receive the echo signal and convert it into a RF receive signal. The low noise amplifier 132 amplifies the RF receive signal. The frequency downconverter 134 may convert the frequency band of the RF receive signal to the baseband or the IF band by using the local oscillation signal from the local oscillator. According to an exemplary embodiment, the frequency downconverter 134 may divide a signal path into an in-phase (I) path and a quadrature phase (Q) path to output down-converted IF signals for an I component and a Q component. The analog-to-digital converter 136 samples the IF signal to convert the IF signal into a receive signal in the form of a digital bit stream.

In an exemplary embodiment, the radar apparatus may be a multiple input multiple output (MIMO) radar using a linear frequency modulation (LFM)/nonlinear frequency modulation (NLFM) signal or a phase modulation signal. However, the disclosure is not limited to this example, and the radar apparatus may be another type of radar sensor. In the case that the radar apparatus is a multiple-input multiple-output (MIMO) radar, a plurality of transmit paths and receive paths may be arranged in parallel and a plurality of transceiver antennas may be used.

The discrete signal processor 200 may include a controller 210, an interference suppression processor 220, and a radar receive signal processor 230. The controller 210 not only controls the overall operations of the discrete signal processor 200 but also controls the transceiver 100. The interference suppression processor 220 may receive the receive signal from the transceiver 100 and suppress the interference caused by other radar apparatus from the receive signal while estimating a target position. The radar receive signal processor 230 may detect the position and speed of the target by performing a pulse integration, pulse doppler processing, and constant false alarm rate (CFAR) detection, etc. on the receive signal with reference to the estimation of the target position by the interference suppression processor 220.

The discrete signal processor 200 may be implemented by a processor capable of executing program instructions stored in the memory 250 and/or a storage device (not illustrated). The processor may be implemented by at least one central processing unit (CPU), graphics processing unit (GPU), digital signal processor (DSP), field programmable gate array (FPGA), or a combination thereof, and the processor may include other processing devices capable of performing the method according to the disclosure. Particularly, each functional configuration of the discrete signal processor 200 may be performed or implemented by the above program instructions.

The memory 250 may include, for example, a volatile memory such as a random access memory (RAM) and a non-volatile memory such as a read only memory (ROM). The memory 250 may load the program instructions stored in a storage device and provide it to a processor implementing the discrete signal processor 200 so that the processor can execute it. Particularly, according to the disclosure, the memory 250 may store reference signal information and/or filter coefficient information of the matched filters 226A-226N corresponding to the respective radar apparatuses 10A-10N.

FIG. 3 is a detailed block diagram of the interference suppression processor 220 illustrated in FIG. 2. The interference suppression processor 220 may include a receive signal buffer 222, a matched filter bank 224, and a signal reconstructor 228. The receive signal buffer 222 may temporarily store the receive signal received through the transceiver 100. The receive signal may be a mixture of a reflected echo signal returned by reflecting a radio signal output from the current antenna apparatus and reflected echo signals of other radar apparatuses serving as an interference signal source. The matched filter bank 224 includes a plurality of matched filters 226A-226N arranged in parallel. The signal reconstructor 228 suppresses the interference caused by other radars from the receive signal based on the outputs of the matched filters 226A-226N in the matched filter bank 224, and outputs the receive signal from which the interference has been suppressed. In this case, the signal reconstructor 228 may also output the target position estimation obtained in the interference suppression process.

Each of the matched filters 226A-226N receives and filters the receive signal stored in the receive signal buffer 222. According to an exemplary embodiment, each of the plurality of matched filters 226A-226N is provided correspondingly to one of the radar apparatuses 10A-10N sharing the frequency resource, and refers the transmit signal of the corresponding radar apparatus 10A-10N as an impulse response. Since each of the matched filters 226A-226N has the impulse response which is the same as the transmit signal of the corresponding radar apparatus 10A-10N, the reflected target signal component associated with the transmit signal of the corresponding radar apparatuses 10A-10N has a high correlation with the receive signal when the intensity of the reflected target signal component is large in the receive signal. The correlation can be determined by the peak value of the filter output. The operator of the radar system including the radar apparatuses 10A-10N sharing the frequency resource is aware of the transmit signal of each radar apparatus 10A-10N, and therefore, may determine the reference signal of the matched filters 226A-226N as above.

The signal reconstructor 228 may receive the outputs of the matched filters 226A-226N in the matched filter bank 224 to determine one of the matched filters 226A-226N showing the largest peak due to the high correlation between the transmit signal of the corresponding radar apparatus 10A-10N and the reference signal as a filter most adequate for interference suppression in a current state. The signal reconstructor 228 may subtract the reference signal of the matched filter 226A-226N determined to be the filter most adequate for the interference suppression at least partially from the receive signal, thereby suppressing the interference caused by the corresponding radar apparatus. The signal reconstructor 228 may gradually suppress the interference included in the receive signal by iteratively selecting a filter most adequate for the interference suppression and subtracting the reference signal of the selected matched filter from the receive signal. Meanwhile, the signal reconstructor 228 may reconstruct and update a desired echo signal by accumulating the reference signal of the present radar apparatus in parallel with suppressing the interference during the above iterative process. After the interference is suppressed sufficiently, the signal reconstructor 228 may output the reconstructed desired echo signal and the target position estimation. Accordingly, the radar receive signal processor 230 illustrated in FIG. 2 may determine the position and speed of the target based on the reconstructed desired echo signal with reference to the target position estimation.

Figure 4:
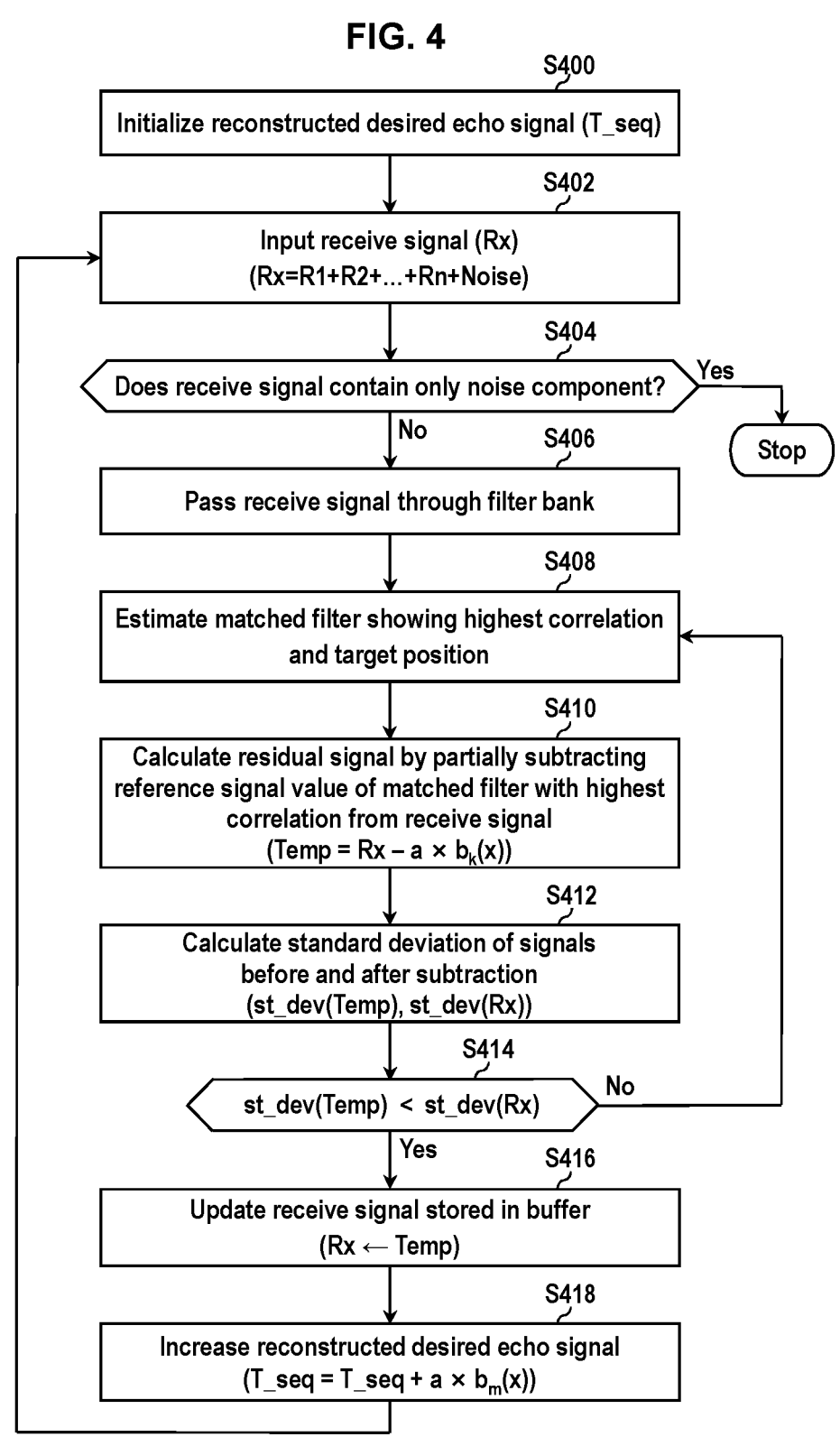
FIG. 4 is a flowchart illustrating an embodiment of an interference reduction process performed by the interference suppression processor shown in FIG. 3.

FIG. 4 is a flowchart illustrating an embodiment of an interference suppression process performed by the interference suppression processor 220 illustrated in FIG. 3.

The interference suppression processor 220 generates the reconstructed desired echo signal $T_{seq}$, from the receive signal stored in the receive signal buffer 222, having a reduced interference component compared with the receive signal. First, the interference suppression processor 220 initializes the reconstructed desired echo signal $T_{seq}$ (operation 400). Subsequently, the interference suppression processor 220 receives the receive signal Rx stored in the receive signal buffer 222 (operation 402). The receive signal Rx may include reflected signals R1-Rn reflected from the target of the signals of the associated transmit signals from the radar apparatuses 10A-10N and may further include an additional noise.

Subsequently, the interference suppression processor 220 may determine whether the receive signal Rx contains only noise without the reflection signal components R1-Rn originated from the radar apparatuses 10A-10N (operation 404). Whether or not the receive signal Rx contains only noise may be identified by, for example, calculating an autocorrelation coefficient or an autocovariance coefficient for the receive signal Rx. If it is determined in the operation 404 that only noise is contained in the receive signal Rx, the process may be terminated or enter a standby state. On the other hand, if it is determined in the operation 404 that the receive signal Rx includes the reflected target signal components R1-Rn in addition to the noise, the receive signal Rx may applied to the matched filter bank 224, so that the receive signal Rx is filtered by all the matched filters 226A-226N simultaneously (operation 406).

Accordingly, each of the matched filters 226A-226N receives and filters the receive signal Rx. The first matched filter 226A is provided correspondingly to the first radar apparatus 10A and has an impulse response being the same as the transmit signal of the first radar apparatus 10A. Therefore, the first matched filter 226A may show a high correlation with the receive signal Rx by outputting a signal with a large peak when the intensity of the reflected target signal component associated with the first radar apparatus 10A is high in the receive signal Rx. Similarly, the second matched filter 226B may show a high correlation with the receive signal Rx by outputting a signal with a large peak when the intensity of the reflected target signal component associated with the second radar apparatus 10B is high in the receive signal Rx. The N-th matched filter 226N may target a high correlation with the receive signal Rx by outputting a signal with a large peak when the reflected target signal component associated with the N-th radar apparatus 10N has a large intensity in the receive signal Rx.

The signal reconstructor 228 may determine that the matched filter having the filter output with a largest peak among the matched filters 226A-226N is associated with a radar apparatus whose reflected target signal causes the greatest interference, and may estimate the corresponding one of the matched filters 226A-226N as the filter most suitable for interference suppression in the current state (operation 408). At this time, the signal reconstructor 228 may also estimate a target position by determining a delay time required for a round trip of the electromagnetic wave to the target in order to take the target position estimation into account in calculating the correlation.

Subsequently, the signal reconstructor 228 may partially subtract the reference signal $b_k(x)$ of the matched filter 226K, which is determined to be the filter most adequate for the interference suppression, from the receive signal Rx as shown in Equation 1 (operation 410). In Equation 1, 'Temp' represents a residual signal generated by partially subtracting the reference signal $b_k(x)$ of the filter from the receive signal Rx, and 'a' denotes a weighting factor representing a degree to which the reference signal $b_k(x)$ is subtracted from the receive signal Rx.

$$\mathrm{Temp}=Rx-a \times b_k(x) \qquad \text{[Equation 1]}$$

In operation 416, the signal reconstructor 228 may replace the receive signal Rx stored in the receive signal buffer 222 with the residual signal Temp, that is, the signal obtained by partially subtracting the reference signal $b_k(x)$ of the filter from the receive signal Rx. The signal reconstructor 228 may repeatedly perform the above process to sequentially suppressing the radar-to-radar in-band interference in the receive signal Rx by selecting a filter that causes a most significant interference to the receive signal and subtracting the reference signal $b_k(x)$ of the filter at least partially from the receive signal Rx at each iteration.

According to an exemplary embodiment, replacing the receive signal Rx with the residual signal Temp may be performed only when the signal power of the interference component is expected to decrease through the replacement. To this end, in the embodiment illustrated in FIG. 4, standard deviations of the signal before and after subtracting the reference signal $b_k(x)$ from the receive signal Rx in the operation 410 may be calculated in operation 412, and the receive signal Rx stored in the receive signal buffer 222 may be replaced with the residual signal Temp only when the standard deviation $st_{dev}$(Temp) of the residual signal Temp after the subtraction is smaller than the standard deviation $st_{dev}$(Rx) of the signal before the subtraction (operation 414).

Each iteration of suppressing the receive signal Rx in the iterative process illustrated in FIG. 4 may increase the reconstructed desired echo signal $T_{seq}$ of the present radar apparatus (operation 418). In other words, in parallel with the suppression of the remaining interference component of the receive signal Rx or residual signal Temp, the reconstructed desired echo signal $T_{seq}$ which may be used by the signal reconstructor 228 later for the target determination may be generated or updated at each iteration. In one embodiment, the reconstructed desired echo signal $T_{seq}$ may updated according to Equation 2. Here, 'a' is a quantity similar to that in Equation 1 and denotes the weight factor representing a degree to which the reference signal $b_m(x)$ is added to the reconstructed desired echo signal $T_{seq}$. The reference signal $b_m(x)$ is a reference signal of the matched filter 226M corresponding to the present radar apparatus 10M which may be the m-th radar apparatus.

$$T_{seq} \leftarrow T_{seq} + a \times b_m(x) \qquad \text{[Equation 2]}$$

As a result, the interference suppression processor 220 may increase the reconstructed desired echo signal $T_{seq}$ that will be used for the target determination while suppressing the receive signal Rx or residual signal Temp including the interference component in proportion to the reference signal of another radar apparatus causing the largest amount of interference whenever an iteration illustrated in FIG. 4 is performed. The iterative process may be repeatedly performed until a predetermined termination condition is satisfied. Examples of the termination condition indicated by the operation 404 of FIG. 4 include a case that only the noise component remains in the receive signal Rx without any further normal reflected target signal component associated with the transmit signal of the present radar apparatus. Another examples of the termination condition include cases that the magnitude of the receive signal Rx is lowered below a predetermined threshold, the standard deviation of the signal is lowered below a predetermined threshold, the magnitude of the reconstructed desired echo signal $T_{seq}$ is increased above a predetermined threshold, or other cases that it is determined that there is no longer interference component in the receive signal or that the interference is sufficiently suppressed. A new iteration process may be initiated for each operating period of the radar apparatus. The standard deviation may be calculated in a unit of one operating period, but the disclosure is not limited thereto.

Figure 5:
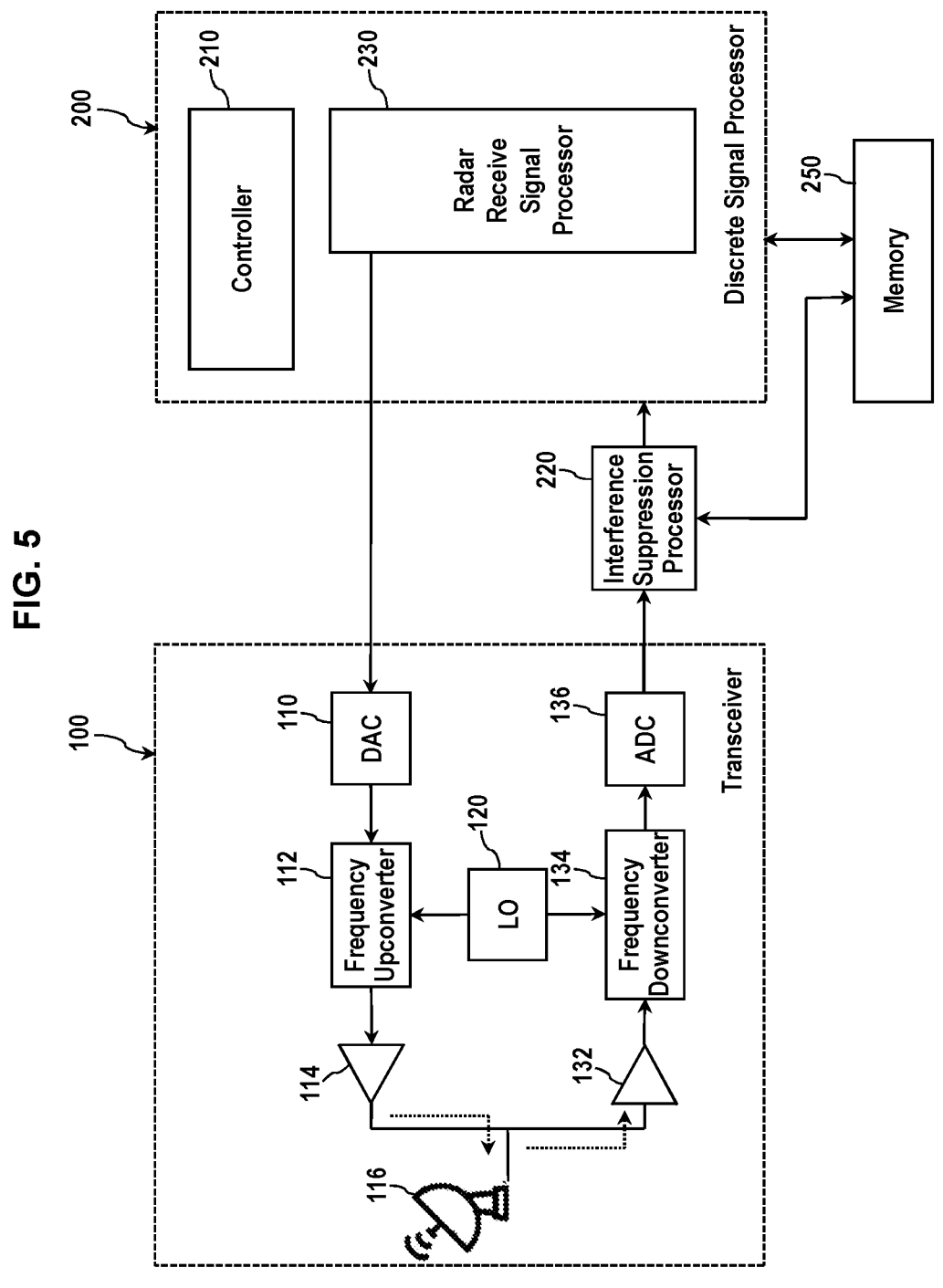
FIG. 5 is a block diagram of a radar apparatus according to another exemplary embodiment of the disclosure.

Although the radar apparatus according to the disclosure may be a newly manufactured apparatus, the disclosure may be implemented by adding necessary modules to an existing radar apparatus. For example, the radar apparatus illustrated in FIG. 2 may be a newly manufactured radar apparatus to implement the interference suppression method of the disclosure. On the other hand, the radar apparatus illustrated in FIG. 5 may illustrate an exemplary apparatus implemented by adding the modules required to implement the interference suppression method of the disclosure. In the radar apparatus of FIG. 5, the interference suppression processor 220 may be connected between the transceiver 100 and discrete signal processor 200 of a conventional existing radar apparatus, and may perform the above-described operation.

Figure 6:
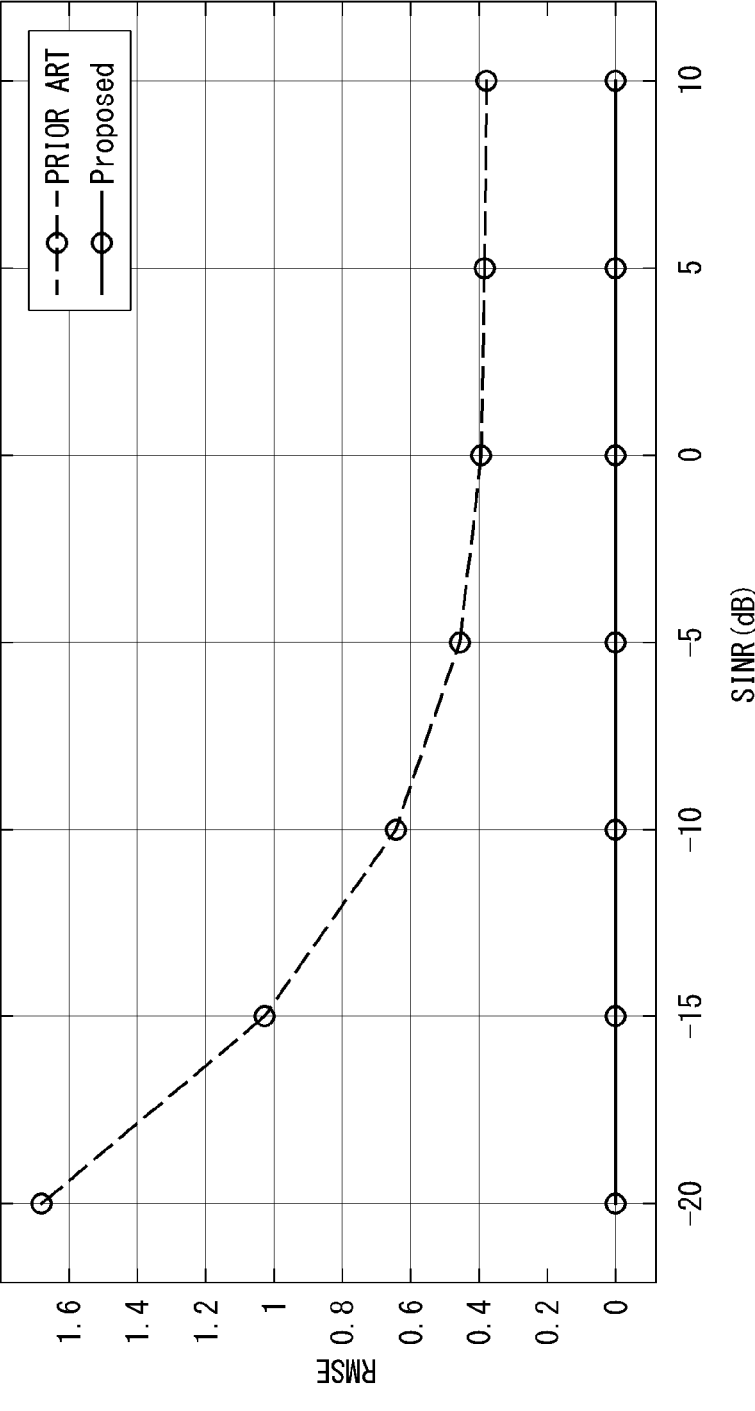
FIG. 6 is a graph illustrating performance comparison results of a radar apparatus according to an exemplary embodiment of the disclosure and a conventional radar apparatus.

FIG. 6 is a graph illustrating performance comparison between a radar apparatus according to an exemplary embodiment of the disclosure and a conventional radar apparatus. This graph is an evaluation of root mean square error (RMSE) according to signal-to-interference-plus-Noise Ratio (SINR), which is measured through a computer simulation for the two radar apparatuses. It can be found that the radar apparatus according to the exemplary embodiment exhibits a significantly lower RMSE than that of the conventional radar apparatus regardless of the SINR value.

Figure 7:
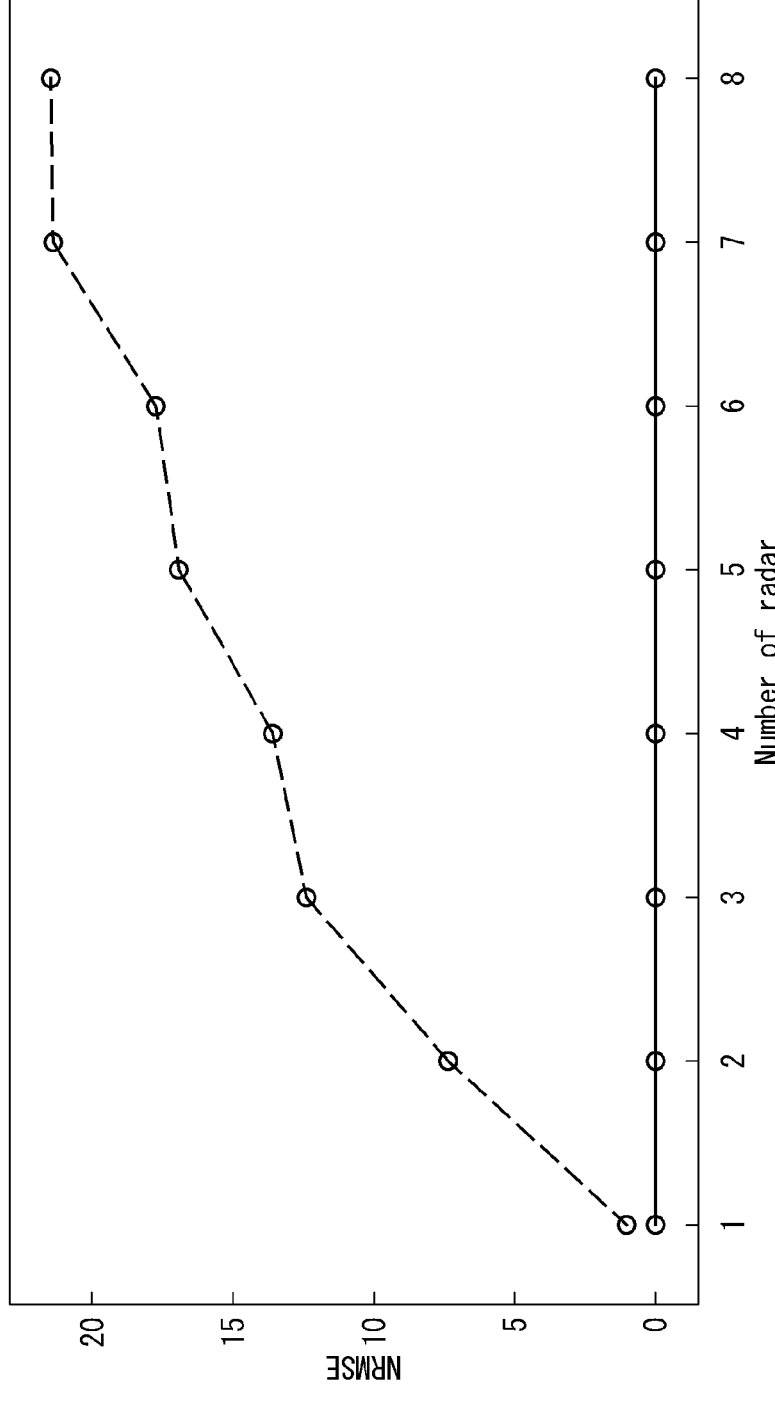
FIG. 7 is a graph illustrating interference suppression performance in each radar apparatus according to a number of radar apparatuses in the radar system.

FIG. 7 is a graph illustrating interference suppression performance in each radar apparatus according to the number of radar apparatuses in the radar system. This graph evaluates a normalized root mean square error (NRMSE) according to the number of radar apparatuses that share the frequency resources, and illustrates the results measured through a computer simulation for the two radar apparatuses. It can be found that, as the number of radar apparatuses that share the frequency resources increases, the radar apparatus according to an exemplary embodiment may maintain a low NRMSE regardless of the number of radar apparatuses that share the frequency resources while the NRMSE of the conventional radar apparatus may greatly increase.

As described above, an own signal or desired echo signal of a radar apparatus is extracted and an interference component is suppressed using only one matched filter that refers to the desired echo signal according to the prior art. However, the signal obtained in this way does not suppress signals caused by the other radar apparatuses and regarded as interference sufficiently and may generate many sidelobe peak signals at the matched filter output, which may cause false alarms or missing to detect weak actual target signals. In the case of a system adopting the CLEAN algorithm, the matched filters referencing other radar transmit signals are coupled in series to suppress the interference signals, but the interference signal that is not removed in each matched filter may be distorted in a next matched filter. Each time the interference signal passes through the matched filter, the distortion may be accumulated and suppression performance may deteriorate.

In contrast, according to the present disclosure, a plurality of matched filters referencing known interference signals are arranged in parallel, and a process of finding a most appropriate interference signal source in the current state and subtracting the interference signal from the received signal is repeated. In parallel with such a process, the desired echo signal is reconstructed. Accordingly, it is possible to prevent the accumulation of the distortion and to allow the high interference suppression performance.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute the program instructions, such as a ROM, RAM or flash memory. The program instructions may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A radar apparatus which is one of a plurality of radar apparatuses sharing frequency resource, comprising:
   a receiver configured to acquire a receive signal;
   a plurality of matched filters arranged in parallel to filter the receive signal, each corresponding to a respective one of the plurality of radar apparatuses to use a transmit signal of a corresponding radar apparatus as a reference signal; and
   a signal reconstructor configured to select a matched filter most adequate for an interference suppression based on outputs of the plurality of matched filters, subtract the reference signal of a selected matched filter at least partially from the receive signal, and reconstruct a desired echo signal to be used to determine a target, repeatedly until a predetermined termination condition is satisfied,
   wherein the termination condition includes a condition that the receive signal contains only a noise component without any remaining echo signal component, a condition that a magnitude of the receive signal is lowered below a predetermined threshold, a condition that a standard deviation of the receive signal is lowered below a predetermined threshold, and a condition that a magnitude of the reconstructed desired echo signal is increased beyond a predetermined threshold.

2. The radar apparatus of claim 1, wherein the signal reconstructor selects one matched filter having an output with a largest peak among the plurality of matched filters as the matched filter most adequate for the interference suppression.

3. The radar apparatus of claim 1, wherein the signal reconstructor identifies that the receive signal contains only the noise component by an autocorrelation coefficient or an autocovariance coefficient for the receive signal.

4. The radar apparatus of claim 1, wherein, each time the signal reconstructor repeats an operation of selecting the matched filter most adequate for the interference suppression, subtracting the reference signal of the selected matched filter from the receive signal, and reconstructing the desired echo signal, the signal reconstructor calculates a residual signal by subtracting the reference signal of the selected matched filter from the receive signal according to a following equation:

$$Temp = Rx - a \times b_k(x)$$

where '$b_k(x)$' is the reference signal of the selected matched filter, 'Rx' is the receive signal, 'Temp' is the residual signal, and 'a' denotes a weighting factor representing a degree to which the reference signal '$b_k(x)$' is subtracted from the receive signal 'Rx'.

5. The radar apparatus of claim 4, wherein the signal reconstructor reconstructs the desired echo signal by a following equation:

$$T_{seq} \leftarrow T_{seq} + a \times b_m(x)$$

where '$T_{seq}$' is the reconstructed desired echo signal, and '$b_m(x)$' is the reference signal of the matched filter corresponding to a present radar apparatus.

6. The radar apparatus of claim 5, further comprising:
   a receive signal buffer configured to store the receive signal and the residual signal.

7. The radar apparatus of claim 1, further comprising:
   a radar receive signal processor configured to determine target information based on the reconstructed desired echo signal.

8. The radar apparatus of claim of 7, wherein the radar receive signal processor determines a position and a speed of the target based on the reconstructed desired echo signal with reference to a target position estimation.

* * * * *